US008073950B2

(12) United States Patent
Goodermote et al.

(10) Patent No.: US 8,073,950 B2
(45) Date of Patent: Dec. 6, 2011

(54) SYSTEM AND METHOD FOR AGGREGATION AND ANALYSIS OF INFORMATION FROM MULTIPLE DISPARATE SOURCES WHILE ASSURING SOURCE AND RECORD ANONYMITY USING AN EXCHANGE HUB

(75) Inventors: Dean Goodermote, Wayland, MA (US); Toby Bloom, Wayland, MA (US); Donald R Miller, Boston, MA (US)

(73) Assignee: Grid Analytics LLC, Wayland, MA (US)

( * ) Notice: Subject to any disclaimer, the term of this patent is extended or adjusted under 35 U.S.C. 154(b) by 516 days.

(21) Appl. No.: 11/493,558

(22) Filed: Jul. 27, 2006

(65) Prior Publication Data

US 2007/0055482 A1 Mar. 8, 2007

(51) Int. Cl.
*G06F 15/16* (2006.01)
(52) U.S. Cl. ........ 709/226; 709/206; 709/219; 709/218; 709/229; 707/602; 707/736; 707/737; 707/769
(58) Field of Classification Search .................... 709/226
See application file for complete search history.

(56) References Cited

U.S. PATENT DOCUMENTS

| 5,508,911 | A | * | 4/1996 | Vanko et al. ................... 700/83 |
| 5,710,884 | A | | 1/1998 | Dedrick |
| 6,088,717 | A | | 7/2000 | Reed et al. |
| 6,874,085 | B1 | * | 3/2005 | Koo et al. ..................... 713/165 |
| 7,308,643 | B1 | * | 12/2007 | Zhu et al. ..................... 715/206 |
| 7,519,591 | B2 | * | 4/2009 | Landi et al. ........................... 1/1 |
| 2001/0054155 | A1 | * | 12/2001 | Hagan et al. .................. 713/193 |
| 2001/0056354 | A1 | * | 12/2001 | Feit et al. ........................... 705/1 |
| 2002/0002603 | A1 | * | 1/2002 | Vange ............................ 709/219 |
| 2002/0038227 | A1 | * | 3/2002 | Fey et al. ........................... 705/3 |
| 2002/0072975 | A1 | * | 6/2002 | Steele et al. .................... 705/14 |
| 2002/0078050 | A1 | * | 6/2002 | Gilmour ........................... 707/9 |
| 2002/0146124 | A1 | * | 10/2002 | Farkas et al. .................. 380/255 |
| 2003/0002603 | A1 | * | 1/2003 | Worm et al. .................... 375/341 |
| 2003/0065620 | A1 | * | 4/2003 | Gailey et al. .................... 705/51 |
| 2003/0083999 | A1 | * | 5/2003 | Ramachandran et al. ...... 705/59 |

(Continued)

FOREIGN PATENT DOCUMENTS

WO 02/03219 A1 1/2002

OTHER PUBLICATIONS

Chaudhuri S et al: "An Overview of Data Warehousing and OLAP Technology" SIGMOD Record, SIGMOD, New York, NY, US, vol. 26, No. 1, Mar. 1997, pp. 65-74, XP002193792 ISSN: 0163-5808.

(Continued)

*Primary Examiner* — Krista Zele
*Assistant Examiner* — Ondrej Vostal
(74) *Attorney, Agent, or Firm* — Hogan Lovells US LLP

(57) ABSTRACT

The invention provides a system and method for automated data analysis in which data agents are located and operate at each member site or data source (i.e., locally). These agents access stored data at the data source or member sites, process the data and also aggregate the results. The aggregated results from each of the member sites are then forwarded to and further aggregated at a central analytic hub. The central analytic hub contains a centralized application which can further aggregate each of the aggregated results and perform a final analysis. These results are then delivered to the requester without any ability to identify individual data sources, or records from those sources.

27 Claims, 5 Drawing Sheets

U.S. PATENT DOCUMENTS

| | | | |
|---|---|---|---|
| 2003/0187688 A1* | 10/2003 | Fey et al. | 705/2 |
| 2004/0006490 A1* | 1/2004 | Gingrich et al. | 705/2 |
| 2004/0058640 A1* | 3/2004 | Root et al. | 455/3.01 |
| 2004/0073482 A1* | 4/2004 | Wiggins et al. | 705/14 |
| 2004/0143171 A1* | 7/2004 | Kalies | 600/300 |
| 2004/0181606 A1* | 9/2004 | Astor et al. | 709/238 |
| 2004/0199789 A1* | 10/2004 | Shaw et al. | 713/201 |
| 2004/0215981 A1* | 10/2004 | Ricciardi et al. | 713/202 |
| 2004/0230534 A1* | 11/2004 | McGough | 705/64 |
| 2005/0010448 A1* | 1/2005 | Mattera | 705/3 |
| 2005/0021519 A1* | 1/2005 | Ghouri | 707/9 |
| 2005/0154627 A1* | 7/2005 | Zuzek et al. | 705/10 |
| 2006/0106799 A1* | 5/2006 | Maijala et al. | 707/8 |
| 2007/0291757 A1* | 12/2007 | Dobson et al. | 370/392 |

OTHER PUBLICATIONS

Clifton C et al: "Tools for Privacy Preserving Distributed Data Mining" SIGKDD Explorations, vol. 4, No. 2, Feb. 28, 2003, pp. 28-34, XP002313509.

Agrawal R et al: "Hippocratic databases" Proceedings of the International Conference on Very Large Data Bases, No. 28 TH, 2002, pp. 143-154, XP002313204.

* cited by examiner

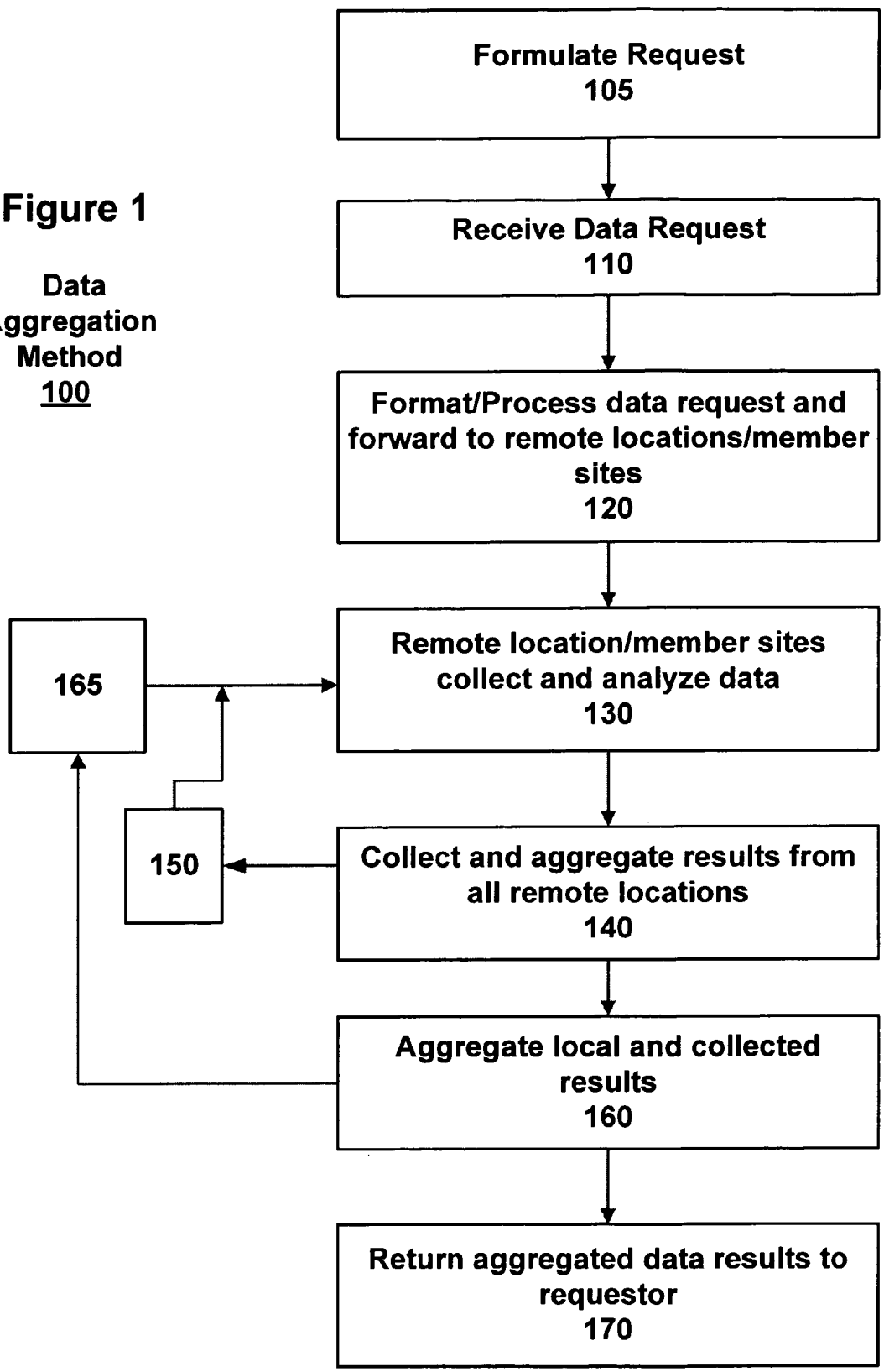

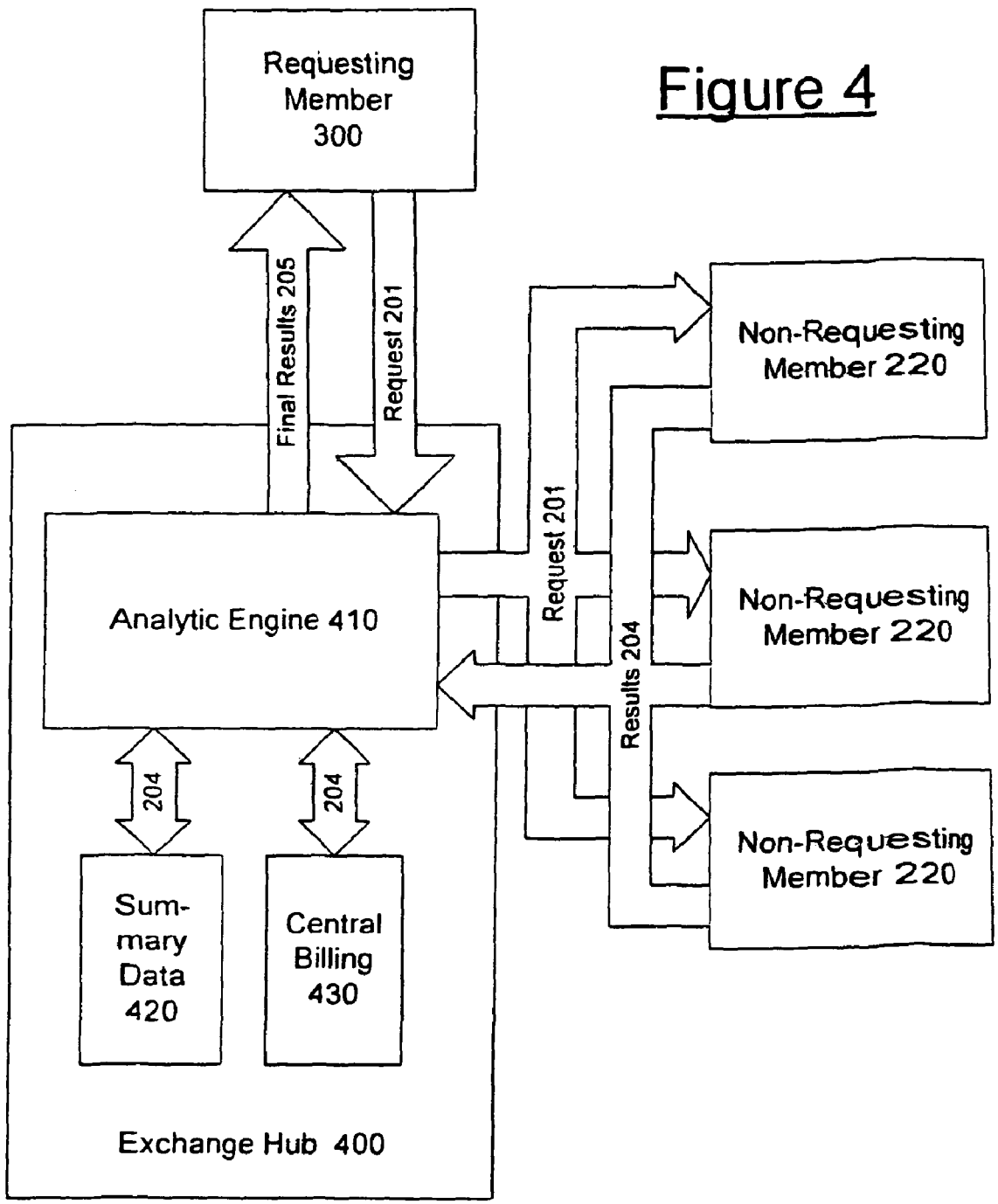

SYSTEM AND METHOD FOR AGGREGATION AND ANALYSIS OF INFORMATION FROM MULTIPLE DISPARATE SOURCES WHILE ASSURING SOURCE AND RECORD ANONYMITY USING AN EXCHANGE HUB

CROSS REFERENCE TO RELATED APPLICATIONS

The present invention claims priority from co-pending U.S. Provisional Application No. 60/553,132 filed on Mar. 16, 2004, the subject matter of which is hereby incorporated by reference in full.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The present invention relates to a system and method for exchanging, integrating and analyzing information from multiple sources, without risking the divulging of potentially confidential information from any of those sources. Specifically, the present invention relates to the use of a data agent that collects, analyzes and aggregates information related to a data set of interest and forwards the results in a form that can be combined with like data from other sites, and without divulging confidential information contained in the data set.

2. Discussion of the Related Art

The analysis of data generally requires a sufficient set of data points to determine whether results represent real correlations or whether they represent random coincidence. In many industries, there are questions that cannot be answered by any one institution because the size and variation of its dataset is insufficient. Competitors, collaborators, and regulators, may have mutual interest in sharing data to provide a joint body of information for answering questions in which they are interested. However, due to competitive, regulatory, or other concerns of trust, institutions may be reluctant to disclose such data, particularly identifying data. Moreover, in other regulated industries, such as healthcare or finance, or in industries where privacy is implied, sharing of certain data is prohibited. Accordingly, a current need exists for a methodology for exchanging, integrating and analyzing information using a technique that can overcome these concerns and prohibitions and provide data of sufficient size and variation with the added benefit of ensuring anonymity of data providers.

Current techniques and systems attempt to address these confidentiality and disclosure problems through the use of various data filters that attempt to forward relevant data while preventing the dissemination of private information, by removing personal identifiers. The data filter may be located at a data source. For example, data may be collected from a hospital using an application that strips patient information from the data records before sending the data records for statistical analysis. Alternatively, other known data stripping utilities operate at a data analysis location, removing confidential information from data acquired from distant location, either before or after statistical analysis of the acquired data.

The problem with these methods is four-fold. First, the anonymization techniques used are often reversible given other external information, or are insufficient to completely anonymize the individual. Second, the data records themselves are no longer under control of the source site, and so could be used inappropriately. Third, to fully anonymize the data may require removal of important fields other than explicit identifiers. This loss of fields or variables may put constraints on the utility of anonymized data in a pooled analysis. Fourth, removing data that might identify an individual might also impede the ability to find and analyze rare events. For meaningful analysis of rare events, which by definition occur infrequently, all data points should be included because sampling techniques are inappropriate and may miscount or otherwise distort the occurrence of the rare events. Not only might the data be removed for de-identification, but the analysis cannot be performed at individual sites and then combined, because rare events will not show up as significant in local analyses.

One relevant example of the points described above occurs in the healthcare industry where, for example, many hospital records systems may not provide release dates, exact age, or indicators of rare medical conditions if they are sufficiently rare to identify the individual. Accordingly, a need exists for an automated data collection technology that is more robust, thereby allowing data collection over a variety of different sources and searches, without losing access to data of interest.

SUMMARY OF THE PRESENT INVENTION

In response to these and other needs, the present invention provides a system and method for automated data analysis in which data agents are located and operate at each member site or data source (i.e., locally). These agents access stored data at the data source or member sites, process the data and also aggregate the results. The aggregated results from each of the member sites are then forwarded to and further aggregated at a central analytic hub. The central analytic hub contains a centralized application which can further aggregate each of the locally aggregated results and perform further analysis. These results are then delivered to the requester without any ability to identify individual data sources, or records from those sources. Because the data agents at the member sites only forward aggregate data and not any of the actual records from the member sites, there is virtually no risk of disclosing confidential information contained in the member sites. The data agents are designed to provide the data aggregates needed for any specific request without custom programming. Moreover, because the request is processed through a central analytic hub, the source of the request may remain anonymous to the member sites, depending upon the procedures established at the hub.

In accordance with the invention, a requesting entity can forward a request for analysis to the central analytic hub. That request is translated into requests to each data agent residing at each member site for data aggregates. No reprogramming is required for each request. When the data aggregates have been collected from each agent, final aggregation and analysis is performed at the hub, and the results delivered to the requester.

The present invention can be applied broadly to industry, government, associations and academia, or wherever large volumes of data need to be collected from numerous sources and analyzed for trends or comparative purposes. The concept is broadly beneficial for four reasons. First, as suggested above, the present invention eliminates the need to house source data in a physical or virtual location under the control of an entity that is different from the original owner. Although the issues are more perceived than real, since the beginning of electronic computing, organizations and individuals have been generally reluctant to share control of their information repositories. A related second reason is that the present invention eliminates a third-party intermediary that must be trusted to store and protect information between collection at a data source and reporting to the data requesting entity. Instead, the sensitive information remains at its originating site, and only aggregated data derived from it is provided to the central analytic hub. Third, it provides unique opportunities for benchmarking in that individual data sources can provide data to the hub for further aggregation, and retain the ability to compare the compiled results to their local results without any other participants seeing local results for any site but their own. Finally, because of its limited intrusiveness, the present invention is also able to frequently offer a greater breadth of information, because fields that would otherwise be removed from anonymized data are now available for analysis.

The present invention has particular application in several fields, including Life Sciences, Healthcare, certain Marketing Research segments, Financial Markets, and Government research, where data are required to be fresh, complete, statistically meaningful, and where privacy is required by regulation or agreement. Examples of applications include:

Surveillance for adverse drug effects (Pharmacovigilance).
Surveillance for medication errors.
Surveillance for indications of bio-terrorism.
Drug Utilization Analysis.
Benchmarking of medical outcomes, patient safety, and quality of health care. Response analysis for marketing programs.
Clinical trials research
Technology assessments in health care.
Market and competitive analysis.
Response analysis for marketing programs.
Periodic government updates on economic indicators.
Retail pricing surveys used to improve a company's product positioning.
Salary data used to benchmark an organization's pay scale.
Interagency security and crime analysis.

Unlike most standard data warehousing techniques, the data collection, analysis and aggregation system of the present invention does not gather individual records for processing and storage at a central site. Instead, the data collection, analysis and aggregation system analyzes individual requests to determine the data needed to fulfill that request and then analyzes and aggregates data at each source site to the maximal extent possible before transferring the data aggregates at a central location to perform final analysis. By aggregating data at source sites, and sending only summary data to the analysis site, no individual records or identities are exposed. The data collection and aggregation system (hub) will conceal the source site identity and requestor information from the summary data. Thus, even the requester of information will remain anonymous. Consequently, the present invention provides a unique advantage that even mutually distrustful organizations, such as competitors, can participate in such a data exchange, and benefit from industry-wide analyses.

The data collection and aggregation system in accordance with the invention is used in the context of an exchange model, in which a set of exchange members agree to host a service to summarize their data in response to specific requests and provide those summaries to the exchange analysis servers. In return, exchange members are granted the ability to request analyses from the exchange, receive compensation for the provision of information, or are considered compliant for regulatory purposes.

Once a request for analysis is made to the exchange, it is processed to identify (1) the data sources needed, (2) the variables to be analyzed, and (3) the strata (or bins) in which to group each variable. Requests are then sent to the agent located at the member sites for the information needed, along with (1) instructions on what data to collect and how to bin the requested data, and (2) instructions on how to aggregate the data. The aggregate requested will not include variables that carry identifying information.

When an agent residing at a member site receives the request, it retrieves the data needed for processing the request, codes it where necessary according to predefined exchange rules or standard dictionaries, bins the data as specified, and computes the summary data requested. The agent then sends this data aggregate to a central analysis hub. That hub may be a single central hub, or the exchange may be configured with regional analysis hubs that perform another level of aggregation or analysis before forwarding to a central hub. The collected data aggregates can optionally be retained at the member sites in case follow-up requests are made.

The results of data analysis are then returned to the initial requester. If the requester wishes to drill down on the results, a follow-up request can be made. That secondary request is forwarded to the member sites and may include pooled results from the first round, as well as make use of the saved aggregates from the first request. The follow-up may require drill-down or re-slicing of the data aggregate computed for the original request.

Thus, the present invention provides a system and method for addressing many of the shortcomings of present data collection and aggregation technologies. Specifically, the present invention provides the novel use of data aggregation methods, particularly data aggregation and summary table technology, to protect the privacy of data without losing critical information needed for analysis. While existing data collection and aggregation techniques may build data slices from a common warehouse, the present invention provides the novel use of paired aggregation and disaggregating techniques to combine data from distinct data sources to a common specification, followed by the merger of the data aggregates from the separate data sources.

The present invention differs from known data collection techniques. The present invention does not reply upon taking only a sample of a data set or otherwise reduce data size or data distribution for performance or throughput improvements. Sampling techniques find a valid subset of data points to reduce data size, to improve performance, or conform to limited resources. In contrast, the present invention provides for meaningful statistical analysis from all data points of interest.

Similarly, the present invention differs from known caching techniques that pull data from a central warehouse and store previous queries or data subsets in caches close to the user. Instead, the present invention takes data aggregates from multiple sources and conveys them through a central site for processing and analysis.

Likewise, the present invention further differs from other known data collection and sampling techniques, such as parallel query techniques that use multiple sites to run queries on slices of the data in parallel to improve throughput; meta-analysis that combines existing results by weighting techniques; and Private Information Retrieval techniques that provide individual data points while protecting identity and source of those data points. The present invention does not provide individual data points, or the potentially confidential information contained in these data points. Instead, the systems and methods of the present invention use intelligence about the mining or analytical techniques to guide data aggregation whereby individual record identifying information is removed while retaining all statistical information relevant to the analysis. In one embodiment, the present invention can be adapted to employ known techniques for removing aggregations below thresholds.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 1 illustrates a flowchart depicting steps in a confidential data aggregation method in accordance with embodiments of the present invention;

FIG. 4 is a block diagram illustrating operation of the exchange hub in greater detail.

DETAILED DESCRIPTION OF THE PREFERRED EMBODIMENTS

Figure 2A:
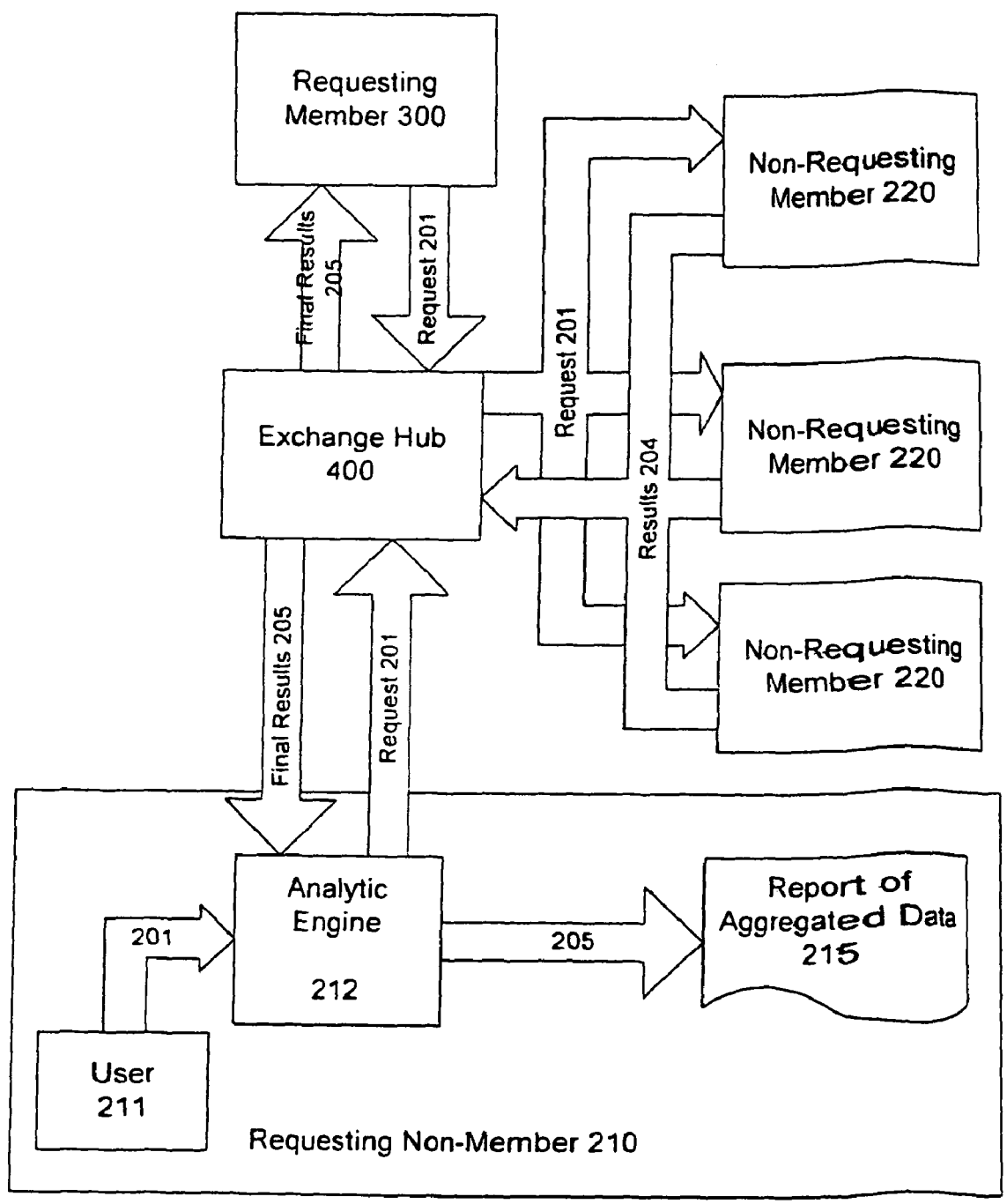
FIG. 2A is a block diagram of a system for data aggregation using an exchange hub in accordance with an embodiment of the invention.

As depicted in FIG. 1, the present invention provides a data aggregation method 100 for the confidential and effective collection of data. The data aggregation method 100 starts at step 105 where a request is formulated and sent by a requesting entity. The process then moves to step 110 when at least one formulated data request is received using known techniques. The request is received from a requestor to a hub or central computer. The received data request defines the desired subject matter and scope of the data collection. For example, the data request may ask for aggregated or statistical results related to the use of a specified medical drug to address a specified condition in a specified area over a specified period. As described in greater detail below, the request is generally in an electronic format and received at the central computer.

In the next step, step 120, the hub or central computer processes and/or transforms the request, which can involve reformulating the request so that it can be understood by data sources and then transmits the processed request to the data sources. Thus, step 120 entails transmitting the processed request as needed to access relevant data in the other locations. Returning to the above example of a request, the central computer may transform a request about a specified medical drug for a specified condition in a specified area over a specified period into a series of Boolean expressions that defines the data search. It should be appreciated that the transformation step may be adapted as needed to access the relevant data contained at the remote location. Similarly, the transformed search request may be used to access previous analyses that are stored at the hub or other location.

The process then moves to step 130. In step 130, the other locations, including other member sites, receive and process the data request. This step generally includes the other locations searching for relevant data and then processing this data. In this step, the other locations process and analyze the data to determine certain statistics. Continuing with the previous example, each location may, for example, produce and analysis and/or statistics that address the effectiveness and side-effects of the specified drug for the specified condition in the specified area over the specified period according to the data contained in that remote location. This analysis of the data that resides at each remote location is generally performed using known techniques.

The process then moves to step 140, where the analyzed data are aggregated at each remote location and then the aggregated data is ready to be sent to the hub. It should be noted that the analyzed data from the remote locations is never the raw information or data, but only the analyzed data, the statistical data or the aggregates. In this way, it is ensured that confidential data is not improperly divulged. Returning to the above example, the identity of patients receiving the specified drug for the specified condition in the specified area over the specified period would not be used or distributed. Even where the search entailed some type of personal data, such as age, race, sex, etc., this data would not be individually available for each patient, but rather, only present as part of the analyzed or statistical results. In other words, the aggregate data would provide analyzed or statistical information on personal data, such as percentages of people falling into certain categories, but no individual patient's data would ever be transmitted or exposed. The aggregate analyzed data is generally derived using known techniques, and may vary according to the techniques used in step 130 to produce the data analysis.

In one embodiment of the invention, the data collection and aggregation step 130 and 140 may operate in an iterative fashion. Thus, in step 150, a remote location may access and aggregate analyzed and/or statistical data about information contained in secondary locations, and then forward this aggregated analyzed and/or statistical data to the central location or hub where it can be further aggregated with data collected from other remote locations, which may likewise be collecting and analyzing data from secondary locations. In this way, data analysis from multiple locations may be compiled and analyzed in an efficient and confidential matter. This embodiment can be considered multi-tiered as there may be multiple levels of hubs and remote locations.

The process then moves to step 160 where the central location or hub can then aggregate and further analyze the collected analyzed and/or statistical data from each remote (local) location with any analyzed and/or statistical data already residing at the central location or hub, such as previously analyzed data. Thus, the hub is capable of performing additional analysis of the data aggregated from various remote locations. Again, the aggregation is generally performed using known techniques and may vary according to the techniques used in steps 130 and 140 to produce the data statistics. At this point, if the hub determines that additional aggregated data from the remote locations is required in order to fulfill the original request, the process moves to step 165 which returns the process to step 130.

The central location or hub can then forward the aggregate analyzed data to the requestor in step 170 using known means. The requestor may subsequently use these results to modify the initial request and to repeat the steps in data aggregation method 100. For example, the requester may change the search terms as needed to refine the results or to collect additional analyzed data and/or statistics.

Turning now to FIG. 2A, an aggregation data exchange 200 for implementing the data aggregation method 100 is now described. The following discussion of the aggregation data exchange 200 refers to a system that can handle both non-members 210 and members 220 and 300. The term "member" is used herein to generally refer to locations that agree to share data results with other locations in the aggregation data exchange 200. Similarly, the term "requesting" is used in this discussion to mean a request for specific statistical or analyzed information about data stored at various remote locations in the exchange. Thus, the non-member 210 merely requests data from locations without likewise providing access to its own data, whereas the requesting member 300 both initiates its own requests and can respond to requests from the non-member requester 210 or from other members 220. The requester, 210 or 300, forwards a request 201 to a central location, or exchange hub 400. The exchange 400 processes the request 201 and forwards the request to the non-requesting members 220.

Each of the non-requesting members 220 receives the request 201 and processes resident data to produce desired analyzed data or statistics based upon the data that resides within each respective non-requesting member 220. This aggregated and analyzed data, which can be referred to as results 204, has been anonymized and is transmitted to the central location or exchange hub 400. The results 204 includes other data as needed for the operation of the exchange 200. For example, the results 204 may include an accounting or bill for the activities of the non-requesting members 220 or information as needed to further process the transmitted results 204. The specific operation of the members 220 and 300, along with the statistical analysis used by the members 220 and 300, is described in greater detail below in FIG. 3 and the associated discussion.

The exchange hub 400 then further aggregates and/or analyzes the results 204 collected from the non-requesting members 220. As described above in the discussion of the data aggregation method 100, the central exchange or hub 400 may combine the results 204 with information already stored at the hub 400, such as data collected in previous searches. These combined results may be referred to as final results 205. The exchange hub 400 then forwards the aggregated and analyzed data, or final results 205, to the requestor 210 or 300. The specific operation of the exchange hub 400 is described in greater detail below in FIG. 4 and the associated discussion.

Where the non-member requestor 210 has initiated the data search, the exchange hub 400 forwards the final results 205 to the non-member requestor 210. The non-member requestor 210 generally includes a user/application 211 who originated the request 201. The non-member requestor 210 further includes an analytic engine 212 that processes and interprets the final results 205, as needed for local use in the form of a report of aggregated data. In one embodiment, the analytic engine 212 may communicate with a billing and credit module (not shown) which may be located at hub 400 in order to further process the request, which may for example involve using known techniques to create an accounting for the data received by the requester. For example, such a billing and credit module can identify the non-requesting members 220 producing the final results 205 and produce an invoice for the service provided by the non-requesting members 220.

It should also be understood that FIG. 2A supports embodiments of the invention whereby the interaction between the exchange hub 400 and the non-requesting members is iterative in nature. In accordance with these embodiments, when the exchange hub 400 receives aggregated data from the non-requesting members 220, it can analyze and aggregate the received data and determine that more information is needed to fulfill the request. In this case, the exchange hub 400 can direct a further request for aggregated data to each of the non-requesting members 220. This iterative process can continue indefinitely until the exchange hub determines that it has received data meeting the request.

Figure 2B:
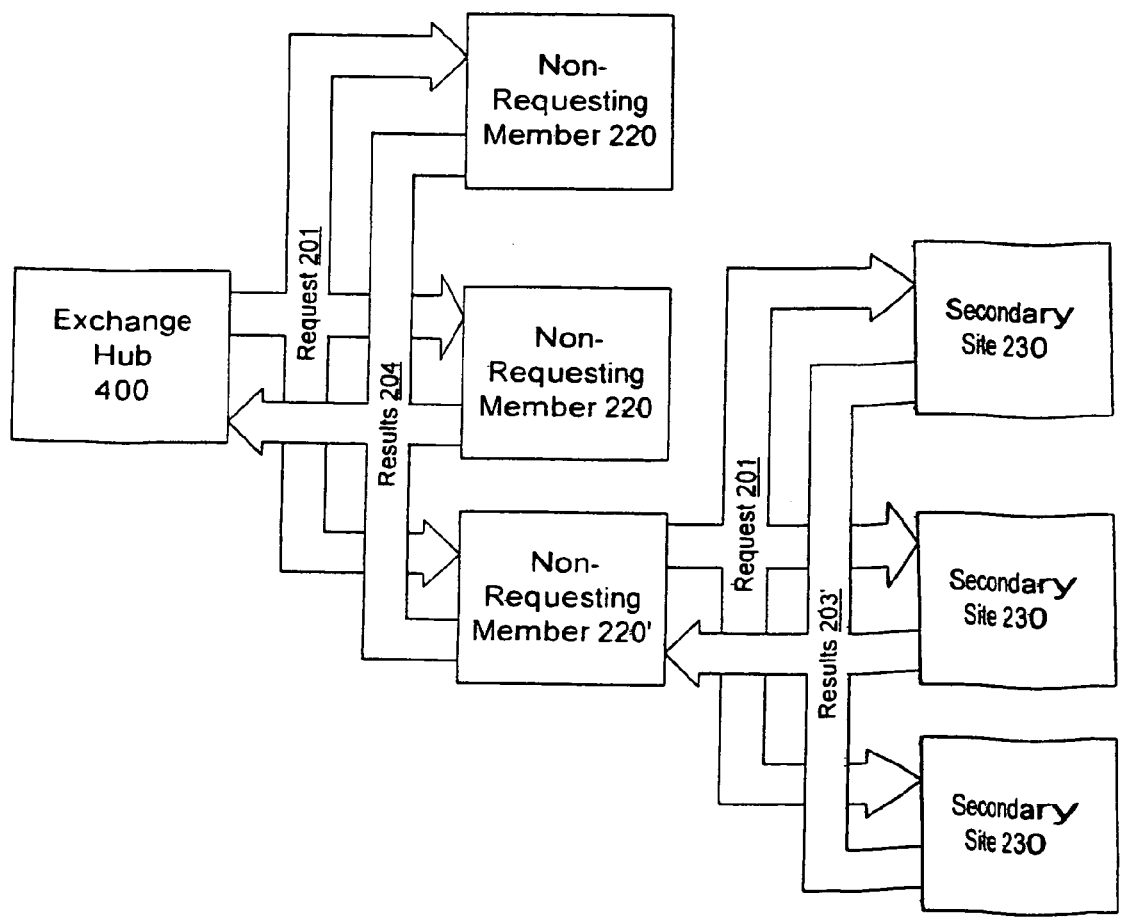
FIG. 2B is a block diagram illustrating the multi-tiered operation of the exchange hub in accordance with an embodiment of the invention.

Referring now to FIG. 2B, a multi-tiered aggregation exchange hub 200' is presented. Thus, in this embodiment, a non-requesting member 220', which is a data source, may seek additional data from another set of data sources (secondary sites 230). Thus, this embodiment illustrates a multi-tiered data aggregation, analysis and retrieval system. As shown in FIG. 2B, in the aggregation exchange hub 200', one or more of the non-requesting members 220' forwards a request 201 to one or more secondary sites 230 that operate in a similar fashion to the non-requesting members 220. These secondary sites 230 then analyze resident data and return analyzed and or statistical results 203' to the associated non-requesting member 220', which then forms aggregated results 204 based upon the results 203' from the secondary sites 230 with data aggregated and analyzed within the non-requesting member 220'. Thus, in this embodiment, the non-requesting member 220' is acting as both a hub, because it is gathering data aggregated from other remote locations, and also as a non-requesting member through its aggregation and analysis of resident data.

Figure 3:
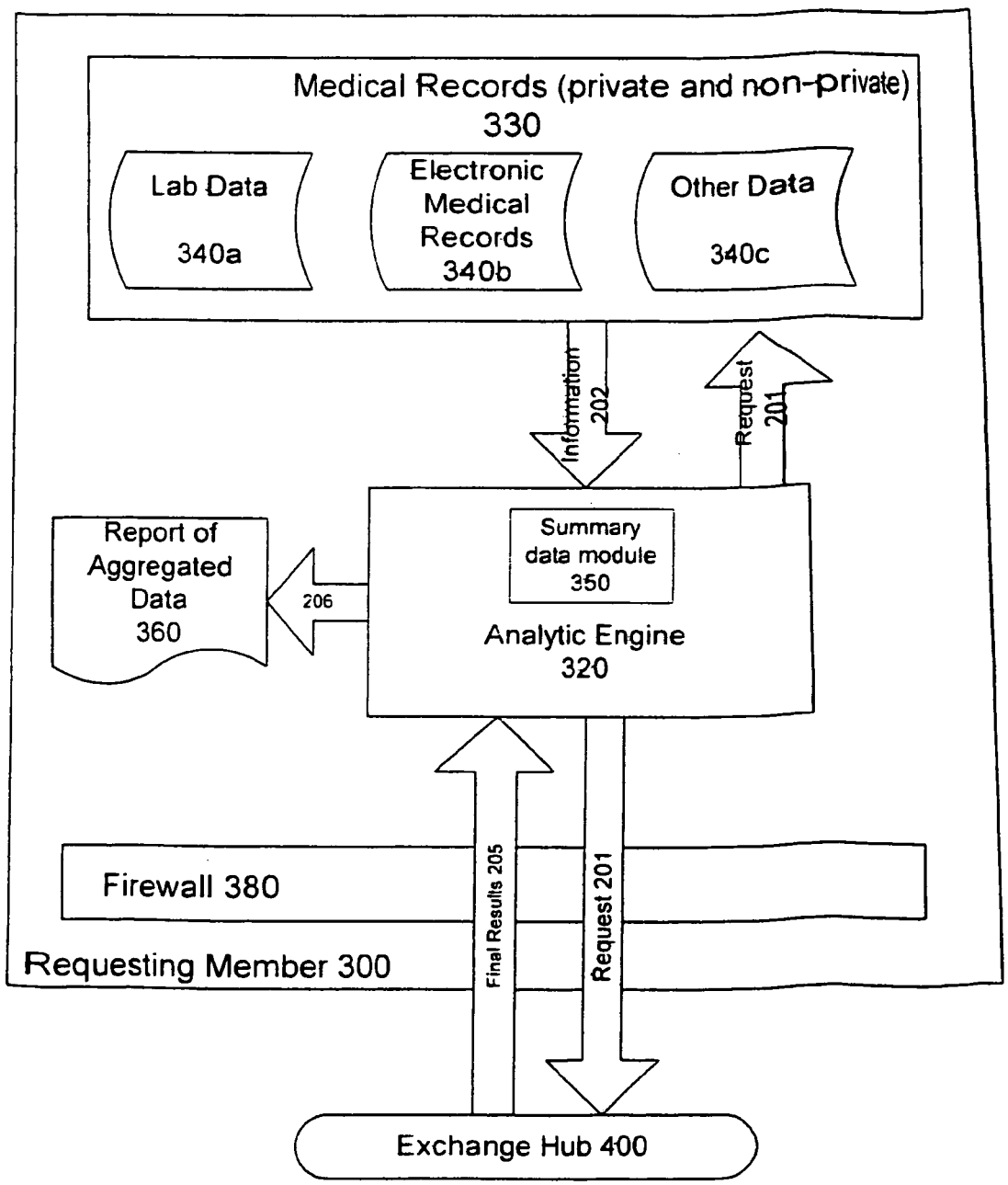
FIG. 3 is a block diagram illustrating operation of an exchange member in accordance with an embodiment of the invention.

The operation of a requesting exchange member 300 (as shown in FIG. 2A) is described in greater detail in FIG. 3. As shown in FIG. 3, a request 201 is sent from the requesting member 300 to the exchange hub 400 via firewall 380. This request 201 may be based upon a request for data received by the requesting member 300 from a user (not shown). Such a user can access the requesting member 300 via any number of know interfaces. As described in connection with FIGS. 2A and 2B, final results 205 are then transmitted to the requesting member 300. The requesting member 300 includes an analytic engine 320 which is a resident application that houses algorithms for processing data and for translating the request 201. The request 201 is sent to the exchange hub 400 (shown in detail in FIG. 2A) to be fulfilled to produce final results 205, as described above. The analytic engine 320 also processes the request 201 to acquire statistics on locally accessible data.

Thus, the analytic engine 320 is proprietary computer software that can be installed at the data source 220 or requesting member 210/300 that allows both the querying of resident data, the querying of other data sources in the exchange, and the combining of resident data with results from the exchange to provide statistically meaningful results.

Resident data may be contained in a resident data repository, which is shown as a medical records database 330 in FIG. 3. In the illustrated example of FIG. 3, the records database 330 contains, for example, composite medical data collected from a variety of locations such as lab data 340a, electronic medical record (EMR) 340b and other sources 340c. The records database 330 is also capable of accessing other locations using known data interfaces as needed to access the respective locations. For example, standard EMR or site specific interfaces may be used.

The composite medical data stored in the resident data repository 330 may contain both private and non-private data. For the purposes of this discussion, private data generally means data that contains potentially identifying information that should not be publicly released. Private data is often intertwined with non-private data and it is typically difficult to automatically and efficiently separate the two.

The requesting member 300 (and 220) uses the analytic engine 320 to acquire data, both private and non-private, from the resident data repository 330 according to the request 201 to create summary data module 350. Thus, a request 201 may be sent to the medical records database 330 and information 202 may be returned to the analytic engine 320. The analytic engine 320 can then analyze and aggregate the information 202. Thus, the analytic engine 320 performs an analysis of relevant data in the resident data repository 330 to produce summary data 350 that is also analyzed and aggregated. Only summary data is transferred to the exchange and this prevents the transfer of source identifying information. Thus, the summary data module 350 may include data (results 206) from the final results 205 and the information 202 that is further analyzed and aggregated.

The summary data module 350 may include a data construct with two or more logical dimensions containing at least (a) a set of core cells encoding specific data points, (b) a grand total point, (c) a subtotal line for each pair of dimensions, and (d) a subtotal plane for each pair of dimensions. For example, the summary data module 350 may represent a logical data structure having three dimensions: Industry, Department, and Direction. If the Industry dimension includes two values (i.e., Automotive and Telecom), the Direction dimension includes two values (i.e., Send and Receive), and the Business Unit dimension includes three values (i.e., Sales, Development, and Consulting), then the subtotal line may contains values indicating, for example, how many total e-mail messages were sent and received by the sales department, how many were sent and received by the development department, and how many were sent and received by the consulting department.

The number of values for each dimension also results in core cells forming a two-by-two-by-three cube of cells. Each cell contains the data for one particular combination of the values for each dimension. For example, the sender and recipient of a particular message may both belong to the consulting department. The sender and recipient may both also belong to the industry vertical section associated with the telecom industry (i.e., the Telecom vertical). Therefore, when processing such a message, data integrating component increments the values in core cells. As a result, grand total point, subtotal lines, and subtotal planes would also reflect those incremented values. Each cell therefore contains summary data for one particular subset of documents. This process is not apparent to the information requestor or to the source of the information.

In alternative embodiments, the summary data module 350 may have more than three dimensions. For example, a summary data module 350 that contains organization-specific document statistics derived from e-mail messages include all of the dimensions described above, as well as dimensions for counting e-mail messages between each pair of units within the organization.

The analytic engine 320 creates results 206 based upon the final results 205 and the information 202, after the information 202 has first been analyzed and/or aggregated. These results 206 are converted by the analytic engine 320 using known techniques to produce a report of aggregated data 360. The report of aggregated data 360 may vary according to the user and the request 201. It should be noted that the report of aggregated data 360 does not generally contain any information on the data sources 340a-c, only statistics acquired from these locations. In this way, the locations 340a-c have no incentive to conceal adverse information.

As discussed earlier, in accordance with embodiments of the invention, the exchange members 220 and 300 may be compensated for providing information. This encourages participation in the exchange 200, especially for cross-industry purposes where the data and analysis are used to answer questions that are not critical to the local organization. For example, the pharmaceutical industry and its regulators could use the exchange 200 to search for incidence of rare adverse events. This search would lead them, not just to their own industry, but to the medical records stored electronically at hospitals and other care providers. While the providers have a general interest in promoting the discovery of adverse events, it is not operationally a priority and is viewed as the responsibility of the pharmaceutical industry and the regulators. By providing income to the providers, the providers are encouraged to allow their data to be used for such purposes, especially so since privacy will be maintained and no individual records nor the data source will ever be released.

The requesting member 300 may further include a firewall 380, that uses known technology to monitor request transmissions 201 and information 202 from the hub 400. The firewall 380 provides security to prevent unauthorized access to information contained in the requesting member 300, or the non-requesting exchange members 220.

FIG. 4 illustrates the operation of the exchange hub 400 in greater detail. FIG. 4 shows that the exchange hub 400 may include an analytic engine 410, a summary data module 420 and a central billing module 430. The analytic engine 410 is proprietary software that runs at the exchange hub 400 and can answer, in a statistically meaningful way, questions that require detailed (individual) data, without giving any access to the individual data items or the data source and, in fact, through the aggregation techniques, hide the source of the data.

Specifically, the analytic engine 410 is a resident application that houses algorithms for processing data statistics and for translating the request 201 as needed for transmission through the aggregation data exchange 200. In operation, the exchange hub 400 can receive a request 201 from a requesting member 300. The analytic engine 410 can process the request 201 and then transmit the processed request 201 to the non-requesting members 220. The analytic engine 410 also processes the request 201 to examine resident data located in a summary date module 420. Aggregated and analyzed results 204 from the non-requesting members 220 are transmitted to the analytic engine 410. The results 204 generally do not come at the same time, but instead in cycles as collected and processed by each of the non-requesting members 220. Thus, the first results 204 aggregated and analyzed by one of the non-requesting members 220 can populate the summary data module 420. As additional results 204 arrive from other non-requesting members 220, the analytic engine 410 updates the summary data module 420 with the new statistics. Final results 205 are produced based upon the results 204 that are further aggregated with additional results coming from the non-requesting members 220 as well as data resident at the exchange hub 400. These final results 205 are transmitted to the requesting member 300.

The analytic engine 410 can also update a central billing and module 430 to credit the various non-requesting members 220 contributing results 204, as described above.

It should be noted that the while the exchange hub 400 of FIG. 4 is a centralized dedicated device, in multi-tiered embodiments, there may be a centralized exchange hub in communication with multiple "second-tier" hubs which behave as hubs and also behave has requesting members.

EXAMPLES

Some examples of requests that might be made to the exchange 200 are now described. Most of the examples are in the health care and pharmaceuticals space, although the exchange 200 is not limited to that industry. Along with the examples, some details of the steps necessary to service that request are provided.

Example 1

Which of the two competing brands of coronary stents (or other medical device) has the lowest complication rate? Typically, no hospital has enough data to answer the question definitively, but combining data from a number of hospitals could address. Accordingly, this type of question may be addressed using the data collection exchange 200 of the present invention. First, the question needs to be clarified and put in precise enough terms that the solution can be posed as a database query. This is a standard step, not related directly to the aggregation, but is more complicated, because the data can be represented differently at different sites. Types of questions to be defined in this example include:
  What events are considered complications? (e.g., consider thrombosis only)
  In what timeframe after implanting the stent must the event occur to be considered related? (e.g., 3 months).
  Are there other variables to be controlled for? (e.g., severity of illness, age, etc)
Each of these questions in then translated into a database query as needed to collected data from relevant data sites 220. Thus, in this example, relevant searchable data may include:
  Total number of patients receiving stents
  Number receiving type A and number receiving type B
  Number receiving type A that had complications within 3 months of surgery
  Number receiving type B that had complications within 3 months of surgery
If a standard EMR is used at the data sources 340, then the data definition is translated into a query against the EMR fields. The percentages for each type of stent could be calculated at each exchange member 220 and sent to the central exchange server 400, along with the total number for each stent type. The information is assembled into exchange format and transmitted to the data analysis tool 410.

If the desired information in this example is not in standard EMR format, then for each site 220, a mapping from local format to the exchange standard format is be predefined. That mapping is used to specify the data available for use in requests. The translation to the exchange standard format is performed as part of gathering the data for the request. Note that even if an EMR standard exists, data may not be maintained natively in that standard format, and so a translation of the request to a local request may be needed.

The analytic engine 410 at the exchange server 400 gathers data from all data sources 220, aggregates that data, and computes the complication rates. Results are then returned to the requestor 210/300. The requester 210/300 may examine the results and decide that more information is needed about the patients to clarify the results. For example, do older patients do better on type of treatment, even if the overall rates do not differ significantly.

The requester 210/300 can then formulate a follow-up query 201 that makes use of previous results. The follow-up query may then be translated into a data query against the previous result sets and sent to the sites 220 for computation. Work on the following query continues as described above. More details of this type of request are described below in Example 2.

Example 2

The complication rates for two stents: In this case, the requester 210/300 wishes to know the relative complication rates of two stents, controlled for age and severity of disease. As in the previous example, the first step in the data collection and aggregation is to clarify the question. In this example, the question clarification requires specifying the strata to be used for age and severity. These criteria may differ for different requests and, consequently, may not be part of the common schema. For example, patients might be aggregated into the following age "bins" or categories: 30-40, 41-50, 51-60, 61-70, 71 and above. Similarly categories are then provided for severity of initial disease.

According to these questions at each data collection site 220, patients are counted by type of stent, age, and severity of disease. This stratification creates numerous subgroups. For example, if there are 5 age categories and three severity categories, then there are 15 subgroups for each of the two stent types, or 30 totals categories to be sent to the Exchange. If stratification becomes too detailed, it can potentially provide a backdoor to confidential identifying information. As described above, threshold criteria may be specified at local sites to prevent to prevent the distribution of statistical data from a limited number of data points.

At the exchange server 400, each of the subgroups is summed with the corresponding subgroups from every other site. Evaluations can be performed to determine whether results are different in different subgroups, and whether there is sufficient data in each subgroup for the results to be valid. In needed for analysis, subgroups can be combined. For example, evaluation can be done on severity of disease versus type of stent, without regard to the patients' ages. These are standard calculations, but it should be appreciated that the individual records are hidden at source site 220 and never revealed to the requestor 210/300. Preferably, the exchange server 400 combines the data subgroups as they arrive, and keeps no site-identifying information. Thus, in addition to protecting confidential patient information, but other confidential information is protected as well, such as physician information, hospital information, exact dates of treatment, etc.

Other Examples

The present invention may be used to phrase questions in the form of predictions. For instance, cardiologists might be interested in being able to predict which patients are likely to suffer strokes after bypass surgery, and known neural net algorithms might be used to provide such predictions. The execution of those algorithms may be divided between member sites and the hub to provide maximum distance between the individual record data and the aggregated data before sending to the hub. The present invention model is fully compatible with this and other types of known data mining techniques.

The present invention has further application in site-specific analysis or benchmarking. For instance, the present invention could be used to determine whether a medical treatment data aggregation outcome correlates with the number of surgeries performed annually at that site or with the number of surgeries performed by a surgeon. In these types of cases, the data aggregation system 200 does not want to identify the site or the surgeon, so the solution is to associate the site or surgeon's performance numbers with the patients before aggregating at a data source 220. Typically, the data source 220 will have only one bin in the aggregation but other data, such as the surgeons' numbers can be combined in to this bin. Then those numbers can be aggregated again at the exchange.

In this way, the only information transmitted from the data source 220 is a number performed procedures and not patients' identities.

In another application of the present invention, complication rates from bypass surgery (or other medical procedures) for different hospitals could be prepared. This query requires some sort of site identifier for comparison. The exchange server 400 can provide a random number to be used as an exchange member 220 (or hospital) identifier in sending out the query. The exchange member 220 can retain that identifier and associate the identifier with the query, but the exchange server 400 retains no record of the association. The exchange server 400 compiles the results, returns the fully aggregated data, not broken down by site, to the requestor 210/300. The exchange server at the requestor 210/300 then compares the results to the global results, and so no comparisons are done or retained at the exchange server 400. Of course, the categorization of similar data source exchange members 220 should provide large enough groupings that no single hospital (exchange member 220) is alone in a group.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. For example, embodiments of the present invention may employ known statistical methods not based on data cubes to collect and aggregate relevant data. Thus, many embodiments of the invention can be made without departing from the spirit and scope of the invention.

What is claimed:

1. A data collection method, comprising the steps of:
    a requestor using an analytic engine to acquire data from a plurality of data locations controlled by different entities by routing a data request through an exchange hub; said request requesting the exchange hub return percentages derived from a plurality of data points and responsive to certain criteria specified by the requestor;
    the exchange hub:
        receiving the data request from the requestor; and
        forwarding the request to the plurality of data locations;
    the plurality of data locations:
        containing said data points, confidential information, sensitive data, and individual records;
        analyzing the data points, confidential information, sensitive data, and individual records to generate the requested percentages;
        continuously maintaining the data points, confidential information, sensitive data, and individual records at the data locations, but sending the requested percentages to the exchange hub, so that the exchange hub can aggregate the requested percentages from the plurality of data locations together; but not sending individual data points or confidential information contained in those data points;
    the exchange hub:
        receiving the requested percentages from the plurality of data locations; said requested percentages containing percentages from multiple data locations; and said requested percentages containing percentages responsive to the criteria specified by the requestor; and
        aggregating the requested percentages from the data locations together; and
        forwarding the aggregation of the requested percentages to the requestor;
    wherein individual records are not gathered for processing and storage at a central site.

2. The method of claim 1 comprising the step of directing the analytic engine to perform an analysis of relevant data in a resident data repository to produce a summary data module containing a data construct having two or more logical dimensions having a set of core cells encoding specific data points, a grand total point, a subtotal line for each pair of dimensions, and a subtotal plane for each pair of dimensions.

3. The method of claim 1 comprising the step of directing the exchange hub to:
    identify the data locations needed to answer the data request;
    identify which variables will need to be analyzed;
    identify which bins in which to group each of the variables;
    send instructions to the data locations to direct the data locations in how they collect and bin the requested data; and
    send instructions to the data locations to direct the data locations in how to aggregate binned data.

4. The method of claim 1 comprising the step of directing the exchange hub to determine whether the received summary data contains enough data points to answer the request; and if not, send a new request to other data locations to obtain additional summary data.

5. The method of claim 1 comprising the step of directing the exchange hub to transform the request into a Boolean expression for querying information about a particular drug for a specified condition in a specified area over a specified period.

6. The method of claim 1 comprising the step of directing the exchange hub to transform the request into a Boolean expression for querying information about a particular device for a specified condition in a specified area over a specified period.

7. The method of claim 1 comprising the step of directing the requestor to:
    query a resident database at the requestor for resident information responsive to said request;
    aggregate data received from the exchange hub with information received from the resident database to form a summary data module; and
    use the summary data module to generate a report of aggregated data which is responsive to the request.

8. A data collection system, comprising:
    a requestor comprising an analytic engine containing instructions for causing the requestor to acquire data from a plurality of data locations controlled by different entities by routing a data request through an exchange hub; said request requesting the exchange hub return percentages derived from a pluralty of data points and responsive to certain criteria specified by the requestor;
    the plurality of data locations comprising:
        said data points, confidential information, sensitive data, and individual records;
        software for directing the data locations to analyze the data points, confidential information, sensitive data, and individual records,
        software for generating the requested percentages; and
        software for directing the data locations to continuously maintain the data points, confidential information, sensitive data, and individual records at the data locations, but directing the data locations to send the requested percentages to the exchange hub, so that the exchange hub can aggregate the requested percentages from the plurality of data locations together; but not send individual data points or confidential information contained in the data points;

the exchange hub comprising software for:

directing the exchange hub to receive the requested percentages from the requestor; said requested percentages originating from multiple data locations; and said percentages being responsive to the criteria specified by the requestor; and directing the exchange hub to-aggregate the requested percentages from the data locations together;

wherein the system does not gather individual records for processing and storage at a central site.

9. The system of claim 8 wherein the analytic engine contains instructions to cause the analytic engine to perform an analysis of relevant data in a resident data repository to produce a summary data module containing a data construct having two or more logical dimensions having a set of core cells encoding specific data points, a grand total point, a subtotal line for each pair of dimensions, and a subtotal plane for each pair of dimensions.

10. The system of claim 8 wherein the requestor contains a summary data module containing a data construct having two or more logical dimensions having a set of core cells encoding specific data points, a grand total point, a subtotal line for each pair of dimensions, and a subtotal plane for each pair of dimensions.

11. The system of claim 8 wherein the software in the exchange hub causes the exchange hub to:

identify the data locations needed to answer the data request;

identify which variables will need to be analyzed;

identify which bins in which to group each of the variables;

send instructions to the data locations to direct the data locations in how they collect and bin the requested data; and send instructions to the data locations to direct the data locations in how to aggregate binned data.

12. The system of claim 8 wherein the software in the exchange hub causes the exchange hub to determine whether the received summary data contains enough data points to answer the request; and if not, send a new request to other data locations to obtain additional summary data.

13. The system of claim 8 wherein the software in the exchange hub causes the exchange hub to transform the request into a Boolean expression for querying information about a particular drug for a specified condition in a specified area over a specified period.

14. The system of claim 8 wherein the software in the exchange hub causes the exchange hub to transform the request into a Boolean expression for querying information about a particular device for a specified condition in a specified area over a specified period.

15. The system of claim 8 wherein the analytic engine comprising instructions for causing the requestor to:

query a resident database at the requestor for resident information responsive to said request;

aggregate data received from the exchange hub with information received from the resident database to form a summary data module; and use the summary data module to generate a report of aggregated data which is responsive to the request.

16. The method of claim 1, wherein the requested percentages contain percentages.

17. The method of claim 1, wherein the requested percentages relate to drugs or medical devices that meet the criteria specified by the requestor.

18. The method of claim 1, wherein the criteria specified by the requestor is a specified condition in a specified area over a specified period.

19. The method of claim 1, wherein the confidential information includes at least one of: confidential patient information, physician information, hospital information, and dates of treatment.

20. The method of claim 1, wherein the data location contains hospital records.

21. The method of claim 1, wherein the individual records includes at least one of: a release date, an exact age, and an indicator of rare medical condition.

22. The method of claim 8, wherein the requested percentages contain percentages.

23. The method of claim 8, wherein the requested percentages relate to drugs or medical devices that meet the criteria specified by the requestor.

24. The method of claim 8, wherein the criteria specified by the requestor is a specified condition in a specified area over a specified period.

25. The method of claim 8, wherein the confidential information includes at least one of: confidential patient information, physician information, hospital information, and dates of treatment.

26. The method of claim 8, wherein the data location contains hospital records.

27. The method of claim 8, wherein the individual records includes at least one of: a release date, an exact age, and an indicator of rare medical condition.

* * * * *